United States Patent

[11] 3,610,246

| [72] | Inventor | James H. Salmon |
| | | 3200 Vine St., Cincinnati, Ohio 45220 |
| [21] | Appl. No. | 859,050 |
| [22] | Filed | Sept. 18, 1969 |
| [45] | Patented | Oct. 5, 1971 |

[54] SURGICAL KNIFE BLADE
1 Claim, 8 Drawing Figs.

[52] U.S. Cl. ..................................... 128/305, 30/294
[51] Int. Cl. ..................................... A61b 17/32
[50] Field of Search ........................... 128/305, 309; 30/294, 315, 317, 339

[56] References Cited
UNITED STATES PATENTS

| 1,316,503 | 9/1919 | Odell | 30/317 |
| 1,546,975 | 7/1925 | Feller | 30/317 |
| 1,639,996 | 8/1927 | Groff | 128/305 X |
| 2,838,049 | 6/1958 | Eisenhofer et al. | 128/305 |

OTHER REFERENCES

V. Mueller & Co., Catalogue, 1956, p. 172 (copy in Gr. 335)

Primary Examiner—Richard A. Gaudet
Assistant Examiner—Kyle L. Howell
Attorney—Pearce & Schaeperklaus ABSTRACT: A surgical knife blade having a head portion provided with a generally hook-shaped cutting edge on a front edge, and sidewise protuberances behind the cutting edge, the blade being constructed to cut a membrane with a cut edge of the membrane riding on the protuberances as the cut advances.

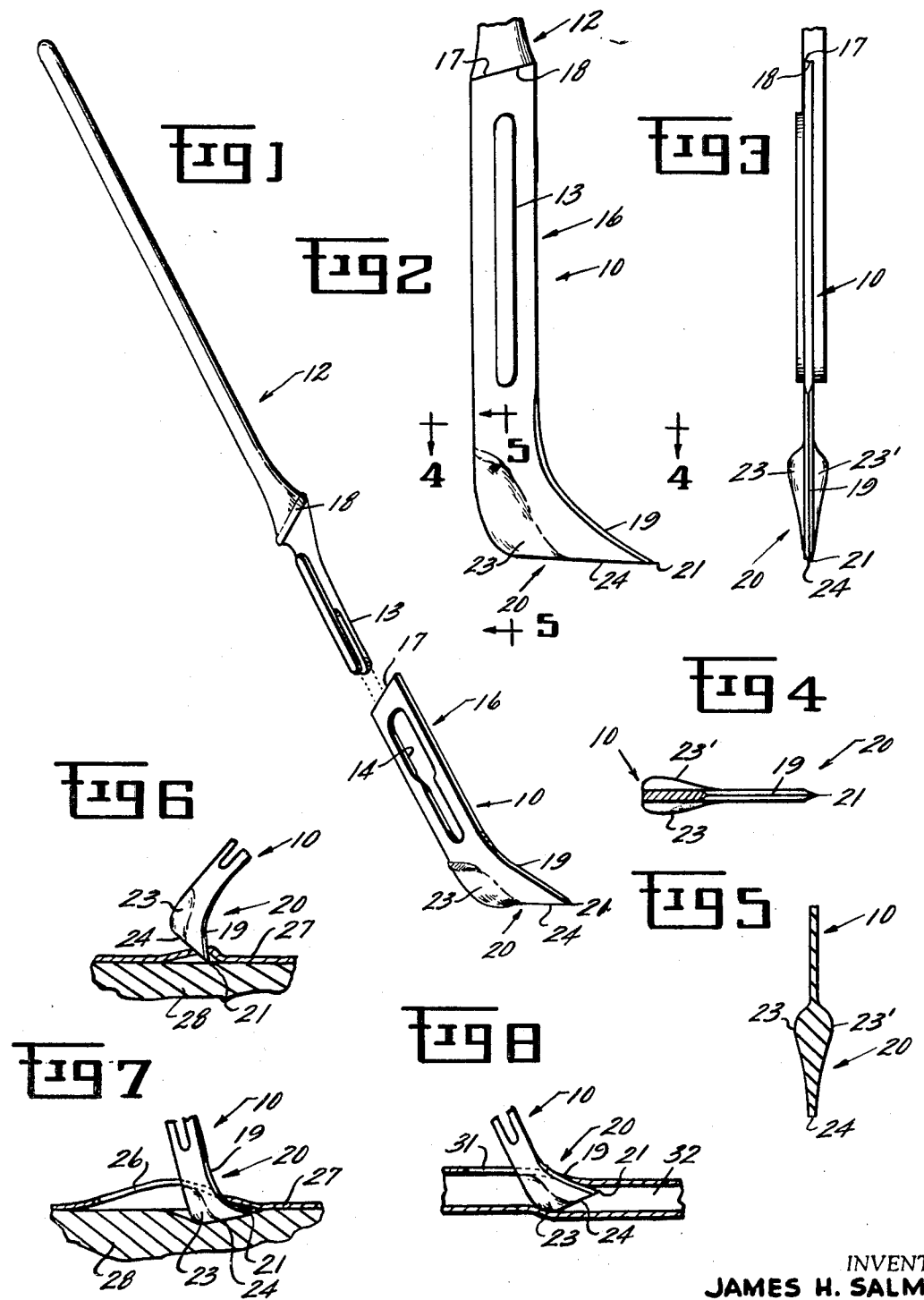

SURGICAL KNIFE BLADE

This invention relates to a surgical knife structure.

An object of this invention is to provide a surgical knife blade which is constructed for cutting a membrane and which raises edges of the cut membrane from the rest of the membrane so that access can readily be had to the edges of the membrane and to areas behind the membrane.

Briefly, this invention provides a knife blade having a hook-shaped cutting edge and a body behind the cutting edge including outwardly extending protuberances on opposite sides of the body behind the cutting edge. As the blade cuts the membrane the protuberances engage cut edges of the membrane to hold the cut edges free of underlying tissues and with the edges of the cut sufficiently separated to receive other instruments for holding the cut edges separate.

The above and other objects and features of the invention will be apparent to those skilled in the art to which this invention pertains from the following detailed description and the drawing, in which:

FIG. 1 is an exploded perspective view of a knife blade constructed in accordance with an embodiment of this invention, the knife blade being shown in association with a handle therefor;

FIG. 2 is a view in side elevation of the knife blade and of a fragmentary portion of the handle shown in FIG. 1, the blade being mounted on the handle;

FIG. 3 is a view in side elevation of the knife blade and of the fragmentary portion of the handle shown in FIG. 2;

FIG. 4 is a view in section taken on line 4—4 in FIG. 2;

FIG. 5 is a view in section taken on the line 5—5 in FIG. 2;

FIG. 6 is a fragmentary view in side elevation of a head portion of the knife blade in association with a membrane and underlying tissues at the start of a cut;

FIG. 7 is a fragmentary view in side elevation of the head portion of the knife blade in association with the membrane and underlying tissues shown in FIG. 6 after a cut has been made; and FIG. 8 is a fragmentary view in side elevation of the head portion of the knife blade in association with a fragmentary portion of a blood vessel.

In the following detailed description and the drawing, like reference characters indicate like parts.

In FIG. 1 is shown a knife blade 10 constructed in accordance with an embodiment of this invention together with a removable handle 12. The handle 12 has a slotted head 13 which can be received in a slot 14 in a shank 16 of the blade to removably mount the blade on the handle as shown in FIG. 2 with an end edge 17 of the blade engaging a shoulder 18 of the handle.

The blade 12 has a cutting edge 19 which is formed on a head portion 20 and curves downwardly and forwardly to a point 21, the cutting edge 19 being generally hook shaped. Behind the cutting edge 19, the head portion 20 of the blade 10 is provided with outwardly extending protuberances 23 and 23' which swell rearwardly and upwardly on opposite sides of the head portion 20 from a lower edge bearing portion 24 of the blade which terminates in the point 21.

The blade is constructed particularly for cutting an elongated opening or slit 26 (FIG. 7) in a membrane 27 such as the membrane known as the "dura mater" or "dura" which overlies a brain 28. In operations involving the brain, after an opening has been made in the bones of the skull (not shown), an opening must be made in the dura to expose the brain itself. The point 21 of the knife blade is extended through the membrance 27 as shown in FIG. 6, and, as the blade is advanced through the dura to cut the opening 26 (FIG. 7), cut edges of the membrane ride over the protuberances 23 and 23' so that the edges of the membrance or dura are raised from the brain 28 and the edges at the line of cut are held apart to permit introduction of appropriate instruments (not shown) for spreading the edges to permit access to the brain. As the cut is being made, the bearing edge 24 passes immediately over the brain. As shown in FIGS. 3 and 5, the bearing edge is flat and the rear portion thereof is rounded, as shown in FIG. 2, to prevent inadvertent damage to the brain as the cut is made.

The knife blade is also constructed for use in cutting an elongated opening 31 (FIG. 8) in a blood vessel 32. The point 21 is inserted through the wall of the blood vessel and then, as the knife blade is advanced along the blood vessel to make the cut, the walls of the blood vessel on opposite sides of the line of cut ride up over the protuberances 23 and 23' as shown in FIG. 8 to prevent collapse of the blood vessel and to cause separation of the walls at the line of cut so that the interior of the blood vessel is laid open.

The knife blade 10 can be removed from the handle 12 when it has been used and can be discarded and another similar blade can be attached to the handle.

The knife blade construction illustrated in the drawings and described above is subject to structural modification without departing from the spirit and scope of the invention.

Having described my invention, what I claim as new and desire to secure by Letters Patent is:

1. A surgical knife blade which comprises a head portion, a generally hook-shaped cutting edge on a front edge of the head portion, and sidewise protuberances on opposite sides of the head portion behind the cutting edge, the blade being of uniform thickness except at the protuberances, the blade being constructed to cut a membrance with cut edges of the membrane riding on the protuberances as the cut advances, the lower end of the blade terminating in a flat bearing face provided with a point at one end thereof and a rounded foot at the other end thereof, the point being at a bottom end of the cutting edge, the protuberances being adjacent and spaced above the rounded foot.